United States Patent
Jansen et al.

(10) Patent No.: US 9,112,945 B2
(45) Date of Patent: *Aug. 18, 2015

(54) AUTOMATIC ADDRESS RANGE DETECTION FOR IP NETWORKS

(75) Inventors: Bernhard Jansen, Rueschlikon (CH); Andreas Kind, Zurich (CH); Marc P. Stoecklin, Riverdale, NY (US)

(73) Assignee: International Business Machines Corporation, Armonk, NY (US)

(*) Notice: Subject to any disclaimer, the term of this patent is extended or adjusted under 35 U.S.C. 154(b) by 674 days.

This patent is subject to a terminal disclaimer.

(21) Appl. No.: 13/390,037

(22) PCT Filed: Aug. 3, 2010

(86) PCT No.: PCT/IB2010/053517
§ 371 (c)(1),
(2), (4) Date: Mar. 8, 2012

(87) PCT Pub. No.: WO2011/018736
PCT Pub. Date: Feb. 17, 2011

(65) Prior Publication Data
US 2012/0163196 A1    Jun. 28, 2012

(30) Foreign Application Priority Data
Aug. 13, 2009  (EP) .................................. 09167839

(51) Int. Cl.
*H04L 12/28* (2006.01)
*H04L 29/12* (2006.01)
*H04L 29/08* (2006.01)

(52) U.S. Cl.
CPC ...... *H04L 61/6068* (2013.01); *H04L 29/12933* (2013.01); *H04L 29/1232* (2013.01); *H04L 61/2092* (2013.01); *H04L 67/34* (2013.01)

(58) Field of Classification Search
USPC .......... 370/248, 252, 256, 408; 709/252, 220, 709/225
See application file for complete search history.

(56) References Cited

U.S. PATENT DOCUMENTS 6,490,592 B1 * 12/2002 St. Denis et al. ...................... 1/1
6,813,645 B1 * 11/2004 Meyer ........................... 709/245
(Continued)

FOREIGN PATENT DOCUMENTS

| CN | 1552139 A | 12/2004 |
|----|-----------|---------|
| CN | 1820262 A | 8/2006  |

(Continued)

OTHER PUBLICATIONS

U.S. Appl. No. 13/609,813.
(Continued)

*Primary Examiner* — Zewdu A Beyen
(74) *Attorney, Agent, or Firm* — Stephen J. Walder, Jr.; Jennifer R. Davis

(57) ABSTRACT

Mechanisms are provided for automatic address range detection for an IP network. Flow data is obtained comprising one of the source and destination IP addresses for the flow and one of (a) the other of the source and destination IP addresses and (b) direction data indicative of the flow direction across the network boundary. A tree data structure is generated representing the IP addresses in the flow data. IP addresses with initial portions in common are represented in the tree with at least one node in common. Weights are assigned to nodes in the tree in dependence on occurrences of the represented IP addresses in at least a subset of the flow data. The IP address range of the network is then detected by identifying, in dependence on the assigned weights, the node associated with the last initial address portion common to all IP addresses in the network. A device is automatically configured with the IP address range to permit distinction between IP addresses inside and outside the network in operation of the device, e.g. for filtering or traffic classification.

9 Claims, 3 Drawing Sheets

(56) References Cited

U.S. PATENT DOCUMENTS

| | | | |
|---|---|---|---|
| 7,477,607 B2* | 1/2009 | Luss | 370/238 |
| 7,890,633 B2* | 2/2011 | St. Pierre et al. | 709/227 |
| 8,139,591 B1* | 3/2012 | Goel et al. | 370/401 |
| 2003/0043820 A1 | 3/2003 | Goringe et al. | |
| 2007/0121632 A1* | 5/2007 | Zabarski | 370/392 |
| 2007/0147246 A1 | 6/2007 | Hurley et al. | |
| 2007/0294369 A1 | 12/2007 | Ginter et al. | |
| 2009/0097418 A1* | 4/2009 | Castillo et al. | 370/255 |
| 2009/0180393 A1 | 7/2009 | Nakamura | |
| 2010/0306410 A1* | 12/2010 | Jansen et al. | 709/245 |
| 2011/0200026 A1* | 8/2011 | Ji et al. | 370/338 |

FOREIGN PATENT DOCUMENTS

| | | |
|---|---|---|
| EP | 2081321 A2 | 1/2009 |
| JP | 2005-210601 A | 8/2005 |
| JP | 2009-171194 A | 7/2009 |
| WO | WO2004/111785 A2 | 12/2004 |
| WO | WO 2008/075224 A1 | 6/2008 |
| WO | WO 2011/018736 A1 | 2/2011 |

OTHER PUBLICATIONS

Massicotte, Frederic et al., "Network Mapping Tool for Real-Time Security Analysis", RTO IST Symposium on "Real Time Intrusion Detection", Estoril, Portugal, http://ftp.rta.nato.int/public/PubFullText/RTO/MP/RTO-MP-101/MP-101-12.pdf, May 27-28, 2002, pp. 12-1 to 12-9.

* cited by examiner

AUTOMATIC ADDRESS RANGE DETECTION FOR IP NETWORKS

BACKGROUND

This present application relates generally to automatic detection of the address range of IP (Internet Protocol) networks. Mechanisms are provided for detecting the IP address range from data on network traffic flows, and automatically configuring a device with the address range to permit a distinction between IP addresses inside and outside the network in operation of the device. Self-configuring network devices which monitor traffic, detect the network address range, and then process traffic flows accordingly are also provided.

In IP networking, devices in each network of a TCP/IP (Transport Control Protocol/Internet Protocol) network system are identified by unique IP addresses. Packets are routed across the network based on the IP address of the destination device. In accordance with the TCP/IP Version 4 system currently employed in IP networks, IP addresses are represented as 32 bits, usually written as four decimal numbers separated by periods. (The upcoming IP Version 6 provides 128 bits for IP addresses but the processes to be described are otherwise analogous). Each decimal number has a value from 0 to 255, being the decimal value of one of the four successive eight-bit segments of the 32-bit address. An IP address effectively consists of two parts, one identifying a network and the other identifying a device in that network. IP addresses of devices in the same network have an initial portion in common. This initial portion identifies the network, in effect defining the address range of all devices in that network. That is, a device belongs to the network if it has an address in the range of possible IP addresses with the appropriate network address prefix. A network address range can be further partitioned if the network is divided into subnetworks (subnets). In this case, a further portion of the IP address is used as the subnet address. The network address plus the subnet address then defines the address range of devices in the subnet, the IP address of each of these devices having an initial portion containing both the network and subnet address.

Devices may need to distinguish between IP addresses inside and outside a network (which may be an entire network or a subnetwork) for a variety of reasons. For example, network devices may need to filter inter-network traffic flows from wholly intra-network flows, or to distinguish such flows for various classification purposes. Such filtering or classifying processes might be used, for instance, for security in firewall or other systems, for rule-based flow control generally, or for flow-based traffic monitoring. In the case of flow-based traffic monitoring, for example, it may be necessary to focus on specific traffic such as traffic sent from network X, or to filter out internet traffic from network-internal traffic, to record details of specific flows only.

Currently devices are manually configured to distinguish between IP addresses inside and outside a network. That is, an operator programs the address range of the network in question into any devices, such as routers, switches or other network devices, which are to process traffic flows accordingly. This operation is repeated each time network addresses change, for example when network segments are added or removed as the network develops or due to network restructuring.

SUMMARY

One aspect of the illustrative embodiments provides a method for automatic address range detection for an IP network. The method comprises obtaining flow data comprising, for each flow relayed by a network device across the network boundary, one of the source and destination IP addresses for the flow and one of (a) the other of the source and destination IP addresses and (b) direction data indicative of the flow direction across the network boundary. The method further comprises generating a tree data structure representing the IP addresses in the flow data such that successive nodes in a branch of the tree are associated with successive portions of an IP address and IP addresses with initial portions in common are represented in the tree with at least one node in common. The method also comprises assigning weights to nodes in the tree in dependence on occurrences of the represented IP addresses in at least a subset of the flow data and detecting the IP address range of the network by identifying, in dependence on the assigned weights, the node associated with the last initial address portion common to all IP addresses in the network. Moreover, the method comprises automatically configuring a device with the IP address range to permit distinction between IP addresses inside and outside the network in operation of the device.

Methods embodying this invention may allow automatic detection of the address range of an IP network from basic flow data, whereby a device can be automatically configured with the address range to distinguish between internal and external IP addresses in subsequent operation. Only basic flow data may be required for operation, relating to flows processed by a network device, such as a switch or router, which "sees" traffic crossing the network boundary. The flow data is obtained at least for each flow which the device relays across the boundary in either direction, i.e. internetwork ("internet") flows. Preferred embodiments also obtain flow data for flows received by the network device from inside the network and relayed back into the network, i.e. intranet (internal) flows. In any case, the flow data obtained for each flow can comprise either: (1) the source and destination IP addresses for the flow; or (2) one of the source and destination IP addresses for the flow, and direction data which indicates the flow direction across the network boundary. In the latter case, the direction data could be any data which distinguishes flows leaving the network (egress flows) from flows entering the network (ingress flows). Either way, a tree data structure is generated to represent the IP addresses in the flow data. In any branch of the tree, successive nodes are associated with successive portions of an IP address and, in effect therefore, successively narrower IP address ranges. IP addresses with initial portions in common, i.e. in a common IP address range, share at least one node in common.

Weights are then assigned to the tree nodes in dependence on occurrences of the represented IP addresses in at least a subset of the flow data as discussed further below. Using these weights, the node which is associated with the last initial address portion common to all IP addresses in the network can be identified in the tree structure. This determines the IP address range of the network. This is used to automatically configure a device with the detected address range to distinguish between internal and external IP addresses in subsequent operation. Embodiments of the invention thus offer a practical and efficient system for automatic address range configuration. The system can be readily applied in a variety of scenarios such as those discussed earlier where it is necessary to distinguish between IP addresses inside and outside a network, avoiding the need for manual configuration.

Depending on the application, the device which is configured with the detected network address may or may not be the network device which processes flows for which the flow data is obtained. However, particular embodiments provide for self-configuration of such a network device by monitoring traffic flows, detecting the network address range, and then processing traffic flows in dependence on the address range so detected. Such a device might be a switch or router which performs a filtering or classification function, for instance classifying traffic flows for some rule-based flow control operation such as prioritizing internal over external flows, or filtering traffic flows for a flow-based monitoring operation where only internal or external flows are to be analysed. Some embodiments may therefore include the step of monitoring traffic flows in the network to obtain the flow data. In other embodiments, the flow data could be obtained from flows processed by a network device, another device being automatically configured with the detected address range. The flow data could be obtained directly from the network device, or indirectly, e.g. by extracting the required data from network traffic records. Indeed, some embodiments may be employed in offline analysis of network traffic records, and in particular for pre-filtering traffic record data for flows of interest. This will be discussed further below.

The tree data structure generated to represent IP addresses in the flow data may take a variety of forms, for example based on prefix trees, or on radix or Patricia trees, as appropriate. Such tree data structures are generally well known entities, having nodes and edges to represent dependencies in the data structure as described further below. In illustrative embodiments, the weights assigned to nodes depend in general on occurrences of the represented IP addresses in at least a portion of the flow data. For example, weights could be assigned in dependence on frequency of occurrence of an IP address in the flow data as a whole, or according to whether the IP address occurs in a particular subset of the flow data, e.g. that relating only to ingress or egress flows. In general, the particular weight values used and the way in which these are assigned to nodes can vary depending on, for example, the content of the flow data, and the precise way in which the IP address range is identified using these weights can vary accordingly. Various examples will be described below to illustrate the principles involved.

Another aspect of the illustrative embodiments provides a computer program comprising program code for causing a computer to perform a method according to the first aspect of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code of the computer program may comprise any expression, in any language, code or notation, of a set of instructions intended to cause a computer to perform the method in question, either directly or after either or both of (a) conversion to another language, code or notation, and (b) reproduction in a different material form.

Another aspect of the illustrative embodiments provides an apparatus for automatic address range detection for an IP network. The apparatus comprises memory for storing flow data which comprises, for each flow relayed by a network device across the network boundary, one of the source and destination IP addresses for the flow and one of (a) the other of the source and destination IP addresses and (b) direction data indicative of the flow direction across the network boundary. The apparatus further comprises control logic adapted to generate a tree data structure representing the IP addresses in the flow data such that successive nodes in a branch of the tree are associated with successive portions of an IP address and IP addresses with initial portions in common are represented in the tree with at least one node in common. The apparatus further comprises control logic to assign weights to nodes in the tree in dependence on occurrences of the represented IP addresses in at least a subset of the flow data and to detect the IP address range of the network by identifying, in dependence on the assigned weights, the node associated with the last initial address portion common to all IP addresses in the network. The apparatus also comprises control logic to configure a device with the IP address range to permit distinction between IP addresses inside and outside the network in operation of the device.

Another aspect of the illustrative embodiments provides a self-configuring network device for an IP network wherein the device is operative to process traffic flows at the network boundary. The device comprises memory and control logic adapted to monitor the traffic flows to obtain flow data which comprises, for at least each flow which is relayed by the device across the network boundary, one of the source and destination IP addresses for the flow and one of (a) the other of the source and destination IP addresses and (b) direction data indicative of the flow direction across the network boundary. The device further comprises control logic adapted to store the flow data in said memory, generate a tree data structure representing the IP addresses in the flow data such that successive nodes in a branch of the tree are associated with successive portions of an IP address and IP addresses with initial portions in common are represented in the tree with at least one node in common, and assign weights to nodes in the tree in dependence on occurrences of the represented IP addresses in at least a subset of the flow data. The device further comprises control logic adapted to detect the IP address range of the network by identifying, in dependence on the assigned weights, the node associated with the last initial address portion common to all IP addresses in the network. In addition, the device further comprises control logic adapted to configure the device with the IP address range for processing said traffic flows in dependence on the IP address range.

In general, where features are described herein with reference to an embodiment of one aspect of the invention, corresponding features may be provided in embodiments of another aspect of the invention.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION

Figure 1:
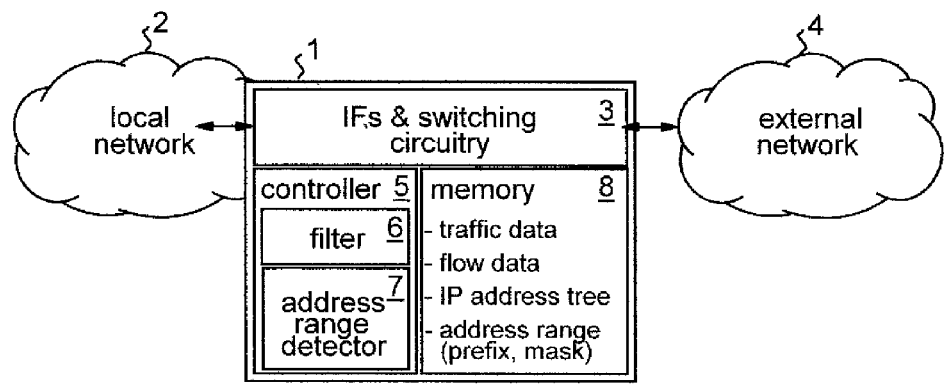
FIG. 1 is a schematic block diagram of a self-configuring network device in accordance with one illustrative embodiment.

FIG. 1 is a simplified schematic of a network device embodying one illustrative embodiment of the present invention showing the key components involved in the operations to be described. In this example, the network device is a router 1 at the boundary of a local network 2. The router 1 includes the usual network interfaces (IFs) and switching circuitry, indicated generally at 3, for routing traffic flows between devices in local network 2 and relaying flows across the network boundary between network 2 and one or more external networks, indicated generally at 4. Router 1 also includes control logic represented by controller 5 in FIG. 1. Controller 5 includes the usual router logic for controlling operation of the router generally. As well as this, controller 5 includes additional control logic, represented in the figure by a filter module 6 and an address range detector 7, providing additional functionality. In particular, router 1 embodies a self-configuring traffic filter, controlled by logic modules 6 and 7, for filtering traffic flows as part of a network monitoring system operative in local network 2. In general, the control logic of controller 5 could be implemented in hardware, software or a combination thereof. In this example, however, the control logic is implemented by software which configures a processor of router 1 to perform the functions described. Suitable software will be apparent to those skilled in the art from the description herein. The router 1 further includes memory 8 for storing various data generated in operation of the router as described further below.

In operation of the network system, router 1 routes traffic flows received from local network 2 or external network 4 in the usual manner according to the TCP/IP network protocol. In addition, filter 6 is adapted to filter traffic flows and record details of local network traffic for network monitoring purposes. More specifically, filter 6 has access to all flows processed by router 1 and is configured to filter out internet flows (i.e. flows relayed by router 1 across the boundary of local network 2), recording details of the remaining flows as traffic data in memory 8. Thus, filter 6 is adapted to record details of local, intranet, flows only, i.e. flows received by router 1 from a source device in local network 2 and relayed back into a destination device in network 2. Traffic data recorded in memory 8 is periodically transmitted to a network monitoring system (not shown) in network 2 which collates and maintains traffic records for network 2 generally. The filter 6 can be based on a known filtering framework such as IP tables, and can be adapted to record any desired traffic data, such as source and destination IP address, source and destination port numbers, number of packets transmitted, connection time, and so on. The traffic records can be gathered and relayed to the network monitoring system generally in accordance with known techniques such as tcpdump, the NetFlow network protocol or the IETF (Internet Engineering Task Force) standard Internet Protocol Flow Information Export (IPFIX).

Fundamental to operation of filter 6 is the facility to distinguish between IP addresses in local network 2 and those in external network 4. For this reason, router 1 is configured with the IP address range of network 2. The address range is defined here by the network address prefix, common to all devices in network 2, which is stored in memory 8 together with the subnet bit-mask which indicates the particular bits to be examined in IP addresses for concurrence with the network address prefix. Filter 6 thus distinguishes internal and external IP addresses by comparing the relevant bits of an address with the address prefix defined in memory 8.

When first connected in the network system, router 1 must be configured with the appropriate address range for its local network 2, and this is updated as required as the network develops or after periodic restructuring. In this embodiment, router 1 is operative in a learning mode in which it detects its local network address range as part of a self-configuration process. The learning mode is initiated automatically on activation of router 1 in the system. Examples of the main operations of the ensuing self-configuration process are outlined in the flowchart of FIG. 2.

Figure 2:
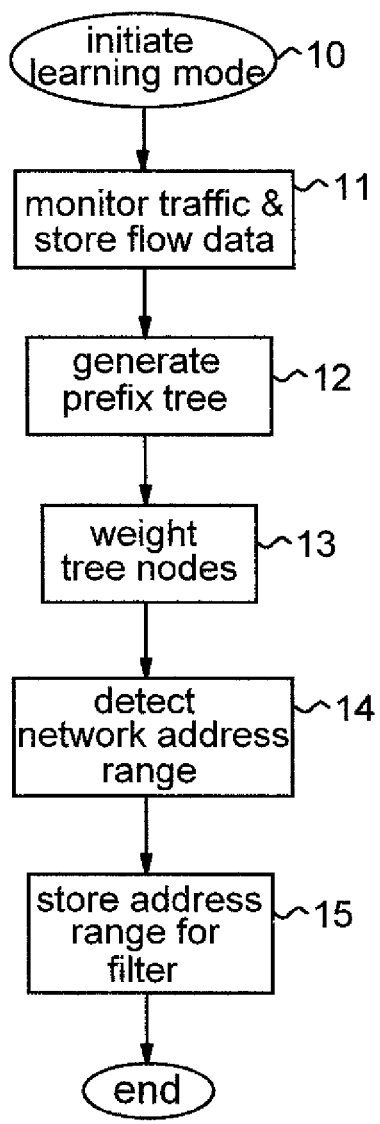
FIG. 2 illustrates example operations of a self-configuration process performed using a self-configuring network device such as shown in the FIG. 1.

After initiation of the learning mode in step 10 of FIG. 2, operation proceeds to step 11 in which filter logic 6 operates to monitor all traffic flows processed by router 1. These include both internet flows, which are relayed across the boundary of local network 2, and internal flows which are received from inside network 2 and relayed back in to the network 2. For each flow, filter 6 extracts predetermined flow data and stores the flow data in memory 8. The content of this flow data depends on the particular address range detection method to be performed, but includes at least one of the source and destination IP addresses for each flow. Specific examples of flow data, and different address range detection mechanisms using this data, will be described in detail below. When sufficient flow data has been obtained, e.g., after a predetermined operating period, operation proceeds to step 12. In this step, address range detector 7 analyzes the flow data to generate a tree data structure representing the IP addresses in the flow data. In this example, the structure generated is a prefix tree and the representation of IP addresses in such a tree will be explained in the examples to follow. Next, in step 13, detector 7 assigns weights to nodes in the prefix tree. The weights are assigned in dependence on occurrences of the represented IP addresses in all, or a predetermined subset, of the flow data as described in more detail below. The resulting tree is then analyzed by detector 7 in step 14. Examples of the analysis mechanisms are described below, but in each case the analysis uses the weights assigned to nodes in the prefix tree to identify the common address prefix of all IP addresses in the local network 2. This defines the address range for network 2, and the resulting prefix and subnet mask are stored in memory 8 in step 15. The learning mode then terminates, and normal filter operation commences using the address prefix stored in memory 8 to distinguish between internal and external IP addresses, and hence local and Internet flows, for the filtering operation.

Figure 3:
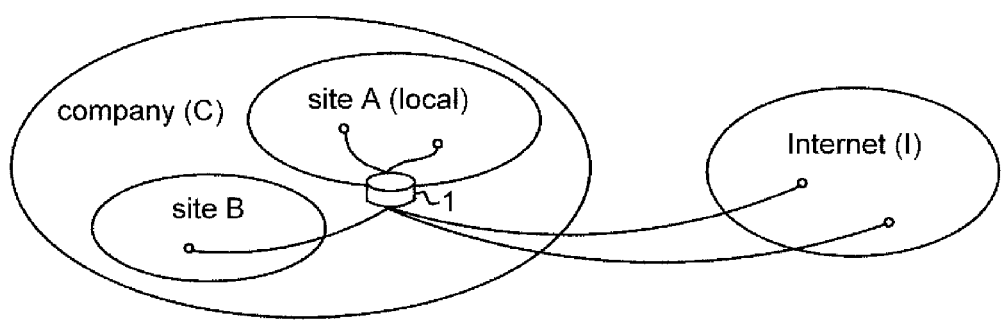
FIG. 3 shows an exemplary network system for which two address-range detection operations for use in the self-configuration process of FIG. 2 may be implemented in accordance with one illustrative embodiment.

FIG. 3 shows a simple network system for which operation of two address range detection mechanisms in the self-configuration process of FIG. 2 will be described. The system shown includes a company network C containing two subnets labeled site A and site B. Site A is the local network of router 1. The Internet (I) in the figure represents all networks external to company network C. For the purposes of illustration it is assumed that, during the learning mode of filter 6 in step 11 of FIG. 2, the following simple set of traffic flows are processed by router 1:

| Source Address | Destination Address | Type |
| --- | --- | --- |
| 9.4.8.2 | 128.178.12.34 | forward Internet traffic (A to I) |
| 128.178.12.34 | 9.4.8.2 | reverse Internet traffic (I to A) |
| 128.111.10.59 | 9.4.1.2 | Internet to webserver (I to A) |
| 9.4.1.2 | 128.111.10.59 | reply to Internet (A to I) |
| 9.3.3.3 | 9.4.1.2 | inter-site request (B to A) |
| 9.4.1.2 | 9.3.3.3 | inter-site reply (A to B) |

-continued

| Source Address | Destination Address | Type |
| --- | --- | --- |
| 9.4.8.2 | 9.4.1.2 | local traffic (A to A) |
| 9.4.1.2 | 9.4.8.2 | local traffic (A to A) |

Figure 4:
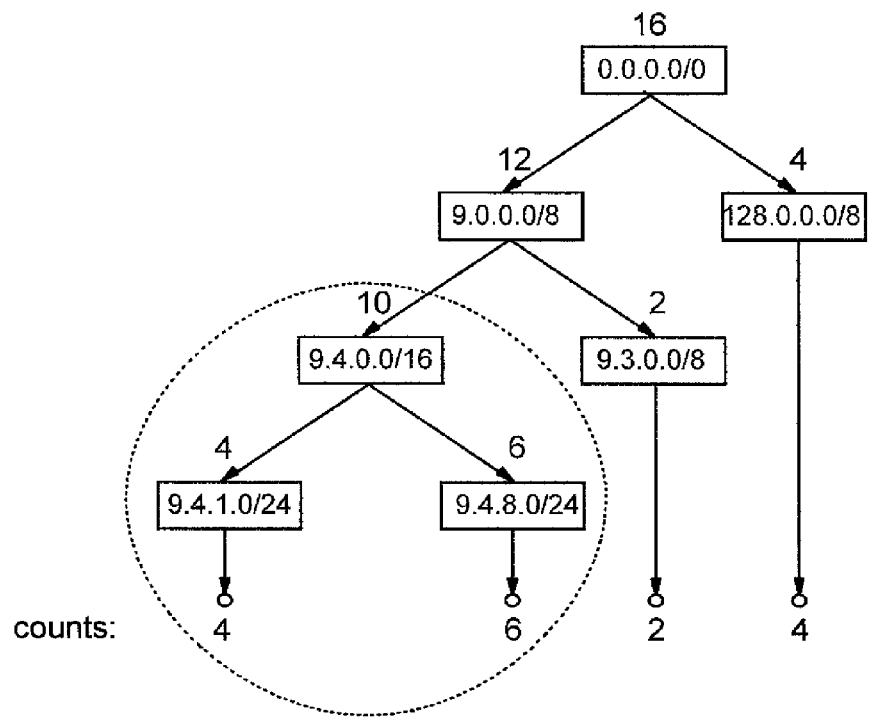
FIG. 4 illustrates a tree data structure generated in a first address range detection process in accordance with one illustrative embodiment.

In the first address range detection mechanism, the flow data stored by filter 6 in step 11 of FIG. 2 consists of the source and destination IP address for each flow monitored in the learning phase. In step 12, a prefix tree is generated by detector 7 in which each of the IP addresses in the flow data is represented by nodes and edges. FIG. 4 illustrates the prefix tree generated for the IP addresses listed above. In FIG. 4, each node is labeled to indicate the initial IP address portion, i.e. the address prefix, it represents, with zeros filling the remainder of the IP address format. The number following the "/" at the end of the address format indicates the length of the bit-mask for the address prefix defined for each node. Thus, following the left hand branch from the root node (effectively a notional node, labeled 0.0.0.0/0 for consistency), the first node is labeled 9.0.0.0/8 and represents an address prefix corresponding to a first 8-bit byte of decimal value 9. The next node is associated with the prefix of the parent node and a second byte of decimal value 4, representing a 16-bit address prefix of 9.4. The last node is again associated with the prefix of its parent and also a third byte of decimal value 1, representing a 24-bit address prefix of 9.4.1. Thus, successive nodes in a branch of the tree are associated with successive portions of an IP address and represent successively narrower IP address ranges. All IP addresses in the flow data are represented by branches in the tree, addresses with a common prefix sharing the appropriate initial nodes. A branch terminates when it contains sufficient nodes to distinguish a unique IP address in the flow data.

In this first mechanism/method, the weighting of tree nodes by detector 7 (step 13 of FIG. 2) is as follows. For each flow monitored in the learning phase, a counter at the leaves of the tree (i.e. ends of the branch) corresponding to each of the source and destination IP address is incremented by 1. The resulting counts thus represent the number of occurrences of the IP address represented by each branch in the flow data obtained for the monitored flows. The counts obtained for this example are indicated by the row of numbers at the bottom of FIG. 4. Next, address detector 7 starts from the leaves of the tree and, progressing up towards the root node, adds the leaf count to a weight (initialized to zero) associated with each node in the branch. Alternatively, with a bit more storage overhead, the weights of nodes could be incremented concurrently with the leaf counters rather than as a separate step. In any case, each parent node receives a weight equal to the combined weight of its child nodes, i.e. the weight of the subtree from that parent node. Reaching the top of the tree, the weight assigned to the root node represents the weight of the entire tree. The resulting weights are indicated above each node in the figure. Consideration of these node weights shows that, in effect, each node associated with a given portion of an IP address is assigned a weight proportional to the number of occurrences of the associated address portion in the IP addresses in the flow data.

The process performed by detector 7 to identify the local network address range from the weighted tree (step 14 of FIG. 2), in accordance with one illustrative embodiment, is expressed by the following algorithm:

```
l ← root node
while ( weight( l ) > weight( root node ) / 2 )
do
  l ← arg max c = children( l ) weight( c )
done
L← parent( l )
```

Using this algorithm, detector 7 can identify the first node which weighs no more than half the weight of the entire tree in the branch following heaviest nodes (l) from the root node. The parent node (L) is then is the root of the subtree representing the local network 2. In effect, therefore, the algorithm dives down the tree, always selecting the subtree with the highest weight. As soon as it reaches a subtree that weighs no more than half the weight of the entire tree, that subtree is inside local network 2. The parent node of that subtree is the root node L of the subtree representing the local network. This node L is the node associated with the last initial address portion (here 8-bit byte) common to all IP addresses in the local network 2, and so represents the address prefix of the local network. Thus, the address prefix associated with the node L defines the address range of the local network. Applying this analysis to the FIG. 4 tree identifies the node of weight 10 as node L, local network 2 being bounded by the circle in the figure. The address range of network 2 is therefore defined by a 16-bit address prefix of 9.4.

The rationale for the above method is as follows. For an internet flow, one of the source and destination IP addresses will be inside local network 2 and the other will be outside. For a local flow, both addresses are in network 2. Assuming, as here, both local and internet flows are monitored in the learning phase, then the number of occurrences in the flow data of IP addresses in the local network 2 must be greater than the number of occurrences of IP addresses outside the network 2. That is, IP addresses in local network 2 represent more than half the occurrences of IP addresses in the flow data. Note that, if local flows are not monitored in the learning phase, i.e. only internet flows are monitored, then the occurrences of internal and external IP addresses will be equal. In other words, IP addresses in local network 2 will represent exactly half the occurrences of IP addresses in the flow data. The above mechanisms and method will still identify the local network correctly, however, provided that the prefix tree does not consist of exactly two adjacent subtrees with the same (maximal) weight. While this simple method may be appropriate for many scenarios, particularly where both internal and internet flows are monitored, the second address range detection method to follow overcomes the potential "balanced-tree" issue just described.

In the second mechanism/method, the flow data stored by filter 6 in step 11 of FIG. 2 includes only the source IP address for each flow monitored in the learning phase. The flow data also includes direction data for each flow. For each internet flow, this direction data indicates the flow direction across the boundary of local network 2, i.e. whether the flow is an ingress flow (entering network 2) or an egress flow (leaving network 2). This data can be obtained by monitoring the particular interfaces by which data packets enter and leave router 1 and is provided, for example, by the NetFlow direction field. In this example, the direction data categorizes internal flows as both ingress and egress. In step 12, a prefix tree is generated by detector 7 representing the IP addresses in the flow data, here the source IP addresses for the monitored flows listed earlier. This tree is generated as described above for the first mechanism and method and is shown in FIG. 5.

The weighting of tree nodes by detector 7 (step 13 of FIG. 2) in the second mechanism/method is as follows. For each flow monitored in the learning phase, a counter at the leaf of the tree corresponding to the source IP address for the flow is incremented by +1 if the flow is an egress flow and by −1 if the flow is an ingress flow. Since internal flows are categorized as both ingress and egress in this example, the counter in this case is incremented by +1 and −1, giving zero net increment. The count values associated with the flows monitored here are as follows:

| Source Address | Type | Direction | Count |
| --- | --- | --- | --- |
| 9.4.8.2 | forward Internet traffic (A to I) | egress | +1 |
| 128.178.12.34 | reverse Internet traffic (I to A) | ingress | −1 |
| 128.111.10.59 | Internet to webserver (I to A) | ingress | −1 |
| 9.4.1.2 | reply to Internet (A to I) | egress | +1 |
| 9.3.3.3 | inter-site request (B to A) | ingress | −1 |
| 9.4.1.2 | inter-site reply (A to B) | egress | +1 |
| 9.4.8.2 | local traffic (A to A) | egress/ingress | !1 |
| 9.4.1.2 | local traffic (A to A) | egress/ingress | !1 |

Figure 5:
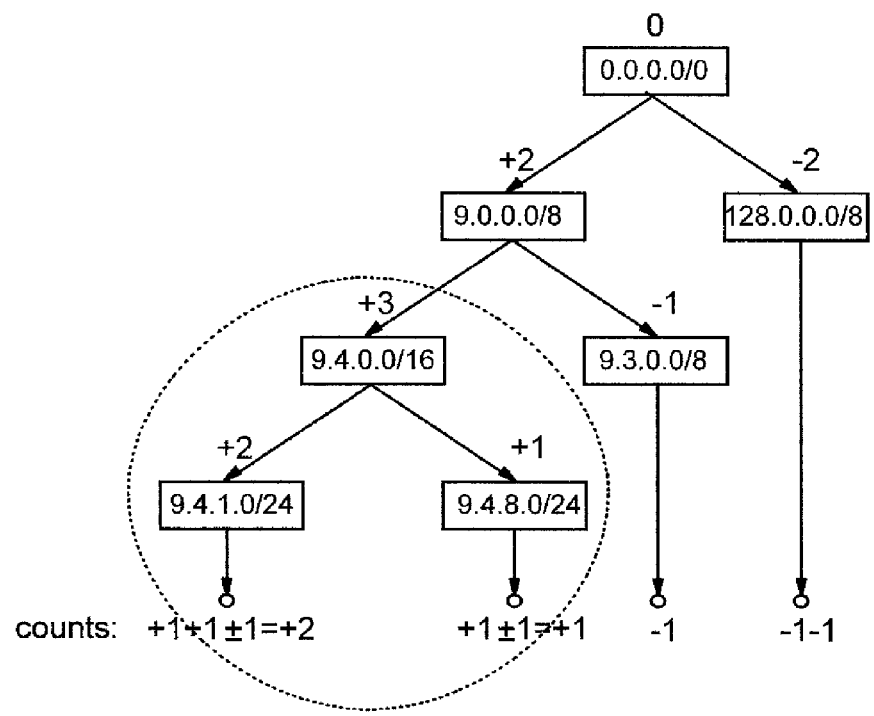
FIG. 5 illustrates a tree data structure generated in a second address range detection process in accordance with one illustrative embodiment.

The count values obtained for this example are indicated by the row of numbers at the bottom of FIG. 5. A positive count value here represents the number of occurrences of the source IP address represented by the branch in the subset of the flow data corresponding to egress flows. A negative count value here represents the number of occurrences of the source IP address represented by the branch in the subset of the flow data corresponding to ingress flows. As before, address detector 7 then starts from the leaves of the tree and, progressing up towards the root node, adds the leaf count to a weight (initialized to zero) associated with each node in the branch. (Again, the weights of nodes could be incremented concurrently with the leaf counters if preferred). Each parent node thus receives a weight equal to the combined weight of its child nodes, i.e. the weight of the subtree from that parent node, and the weight assigned to the root node represents the weight of the entire tree. Consideration of the resulting node weights shows that, in effect: each node associated with a given portion of an IP address in the subset of egress flows is assigned a weight of positive polarity proportional to the number of occurrences of the associated address portion in that subset; and each node associated with a portion of an IP address in the subset of ingress flows (i.e. not in the egress-flow subset) is assigned a weight of opposite polarity proportional to the number of occurrences of the associated address portion outside the subset of egress flows.

In accordance with one illustrative embodiment, to identify the local network address range from the weighted tree (step 14 of FIG. 2), detector 7 implements the following algorithm:
1—start from the root node
2—select the child node with positive weight (all others are by definition negative)
3—repeat 2 until more than one subtree with positive weight is found.

The current node (L) is then the root of the subtree representing the local network 2. Again, this node L is the node associated with the last initial address portion (here 8-bit byte) common to all IP addresses in the local network 2, and so represents the address prefix of the local network. In effect, therefore, it can be seen that the IP address range of the network is detected by identifying the first node, in a branch extending from the root node of the tree, which is associated with an IP address portion in the subset of egress flows and which has more than one child node associated with an IP address portion in that subset. Applying this analysis to the FIG. 5 tree identifies the node of weight +3 as node L, local network 2 being bounded by the circle in the figure. As before, therefore, the address range of network 2 is identified by the 16-bit address prefix 9.4.

The rationale for the second mechanism/method is as follows. Moving through the tree from the root, as long as one is in a subtree with positive weight (i.e. the source IP address is for an egress flow), one is heading towards the local network. As soon as one cannot distinguish the subtrees any more by this criterion, one has converged on the root node of the local network.

Both of the mechanisms/methods described above have been shown to work well with flow sampling. Note, however, that the weighting could be performed differently in each case providing that the underlying principles which allow identification of the local network root node are followed. For example, in the second mechanism/method above, the weights serve primarily to distinguish ingress and egress flows. Hence, internal flows need not be considered, or even monitored at all, if desired. Further, any weighting system which distinguishes the IP addresses for ingress and egress flows could be used. For example, weights (which might be a simple bit-flag) could be assigned only to source addresses for egress flows, leaving addresses for ingress flows unweighted (unflagged). Step 2 of the above algorithm would then simply follow weighted (flagged) child nodes. In general, where source IP addresses are represented in the tree, weights can be assigned to nodes in dependence on occurrence of the represented IP addresses in a subset of the flow data corresponding to egress flows. The same principles could also be applied using destination addresses for monitored flows. That is, the flow data could comprise the destination IP address for each monitored flow, together with the direction data as before. Weights could then be assigned to nodes in the tree in dependence on occurrence of the represented IP addresses in a subset of the flow data corresponding to ingress flows.

It will be seen that the embodiments described above allow automatic self-configuration of the local network address range in router 1 for use in the subsequent filtering operation. The learning mode can be initiated on first installation of the router, or on installation of filter functionality in a pre-installed router 1, avoiding the need for manual configuration. The self-configuration process can be repeated whenever required, for example after each change in the network structure potentially affecting the local address range. Alternatively, controller 5 could be operative in a steady-learning mode, effectively performing constant learning in the background, continually updating the prefix tree as required and checking the address range after any changes. Network segments can therefore be added or removed without requiring manual reconfiguration of address ranges.

Various alternatives and modifications can be envisaged to the specific embodiments described above. For instance, in the simple scenario above, the subnet masks shown in FIGS. 4 and 5 are of lengths which are multiples of 8-bit bytes. The subnet masks are thus aligned with the bytes of the IP address format. The prefix trees used above are most conveniently employed in such cases. However, embodiments of the invention can be readily applied to systems with non-byte-aligned subnet masks. In such cases, radix or Patricia trees can be conveniently employed for the tree data structure. Such tree structures are well-known and need not be discussed in detail here. Briefly, however, such trees can be constructed bit-by-bit, merging any single-child parent node with its child, so that the address portions represented by different nodes may be of varying lengths, thus accommodating different bitmasks and network address ranges defined by different prefix-lengths. Detailed processes for generating these trees here will be readily apparent to those skilled in the art. The same basic principles described above for weighting nodes and identifying address ranges apply equally to such embodiments.

Automatic address range detection mechanisms/methods embodying the invention could be employed in any network device, such as a switch, router or other exchange-point device, which needs to distinguish local and internet traffic for some reason. Instead of filtering traffic, such a device might need to classify traffic, e.g., for flow control or monitoring purposes. Such filters or classifiers might be employed, for example, in network firewalls. The filtering or classification rules could of course be based on further information about a flow in addition to whether the flow is an internal or external flow. One example here is source and destination port numbers which might be used to filter or classify traffic by application, for example in firewall systems. Such port number information could be recorded as flow data and added to the tree structures if desired for use in the subsequent processing.

While flow data is obtained by directly monitoring traffic in router 1 above, in other embodiments flow data could be obtained from another network device or by extracting the required data from network traffic records. Indeed, some embodiments may be employed in offline analysis of network traffic records, and in particular for pre-filtering traffic record data for flows of interest. Typical traffic records can contain huge amounts of data, though often only part is of interest for analysis, e.g., traffic from a particular network or traffic internal to a particular network. Methods embodying the invention may therefore be used in a device which processes flow data obtained from traffic records to identify a network address range of interest, this address range then being recorded for use in subsequent analysis to identify the relevant flows in the traffic records. Such a device can therefore operate, in effect, as a self-configuring prefilter for network traffic data. Clearly, however, the underlying functionality may be distributed over more than one device of a traffic record analysis system if desired. In any case, such a prefiltering system can efficiently extract required data from more general traffic records, and avoids the need for manual configuration of network segments to actively filter traffic according to requirements.

It will be appreciated that many other changes and modifications can be made to the exemplary embodiments described without departing from the scope of the invention.

What is claimed is:

1. An apparatus for automatic address range detection for an IP network, the apparatus comprising:
    memory for storing flow data which comprises, for each flow relayed by a network device across a network boundary, one of a source IP address or a destination IP address for the flow and one of (a) the other of the source IP address or destination IP address, or (b) direction data indicative of a flow direction across the network boundary; and
    control logic configured to:
    generate a tree data structure representing IP addresses in the flow data such that successive nodes in a branch of the tree data structure are associated with successive portions of an IP address, and IP addresses with initial portions in common are represented in the tree data structure with at least one node in common;
    assign weights to nodes in the tree data structure in dependence on occurrences of represented IP addresses in at least a subset of the flow data;
    detect an IP address range of the IP network by identifying, in dependence on the assigned weights, a node associated with a last initial address portion that is common to all IP addresses in the IP network; and
    configure a network device with the IP address range to permit distinction between IP addresses inside and IP addresses outside the IP network in operation of the network device.

2. A self-configuring network device for an IP network wherein the network device is operative to process traffic flows at a network boundary, the network device comprising:
    memory; and
    control logic configured to:
    monitor said traffic flows to obtain flow data which comprises, for at least each flow which is relayed by the network device across the network boundary, one of a source IP address or a destination IP address for the flow and one of (a) the other of the source IP address or the destination IP address, or (b) direction data indicative of a flow direction across the network boundary;
    store the flow data in said memory;
    generate a tree data structure representing IP addresses in the flow data such that successive nodes in a branch of the tree data structure are associated with successive portions of an IP address, and IP addresses with initial portions in common are represented in the tree data structure with at least one node in common;
    assign weights to nodes in the tree data structure in dependence on occurrences of represented IP addresses in at least a subset of the flow data;
    detect an IP address range of the IP network by identifying, in dependence on the assigned weights, a node associated with a last initial address portion common to all IP addresses in the IP network; and
    configure the network device with the IP address range for processing said traffic flows in dependence on the IP address range.

3. The self-configuring network device as claimed in claim 2 which is configured for one of filtering and classifying said traffic flows.

4. A computer program product comprising a non-transitory computer readable medium having a computer readable program stored therein for automatic address range detection for an Internet Protocol (IP) network, wherein the computer readable program, when executed on a computing device, causes the computing device to:
    obtain flow data comprising, for each flow relayed by a network device across a network boundary of the IP network, one of a source IP address or a destination IP address for the flow and one of (a) the other of the source IP address or destination IP address, or (b) direction data indicative of a flow direction across the network boundary;
    generate a tree data structure representing IP addresses in the flow data such that successive nodes in a branch of the tree data structure are associated with successive portions of an IP address, and IP addresses with initial portions in common are represented in the tree data structure with at least one node in common;
    assign weights to nodes in the tree data structure in dependence on occurrences of represented IP addresses in at least a subset of the flow data;
    detect an IP address range of the IP network by identifying, in dependence on the assigned weights, a node associated with a last initial address portion that is common to all IP addresses in the IP network; and automatically configure the network device with the IP address range to permit distinction between IP addresses inside and IP addresses outside the network in operation of the network device.

5. The computer program product of claim 4, further comprising:

obtaining said flow data also for each flow received by said network device from inside the IP network and relayed back into the IP network.

6. The computer program product of claim 4, wherein:

the flow data comprises the source IP address and the destination IP address for each said flow; and the weights are assigned to nodes in the tree data structure in dependence on a number of occurrences of the represented IP addresses in the flow data.

7. The computer program product of claim 6 wherein:

each node is assigned a weight proportional to a number of occurrences of an associated address portion, in the IP addresses in the flow data; and the IP address range of the IP network is detected by identifying a first node which weighs no more than half a weight of the tree data structure in the branch following heaviest nodes from a root node of the tree data structure.

8. The computer program product of claim 4, wherein:

the flow data comprises the source IP address for each said flow, and said direction data for flows relayed across the network boundary; and weights are assigned to nodes in the tree data structure in dependence on occurrence of the represented IP addresses in a subset of the flow data corresponding to flows leaving the IP network.

9. The computer program product of claim 8, wherein each node associated with a portion of an IP address in said subset is assigned a weight of a first polarity proportional to a number of occurrences of the associated address portion in said subset, and each node associated with a portion of an IP address not in said subset is assigned a weight of opposite polarity proportional to a number of occurrences of the associated address portion outside said subset.

\* \* \* \* \*